(12) United States Patent
Hearns et al.

(10) Patent No.: US 8,686,580 B2
(45) Date of Patent: Apr. 1, 2014

(54) POWER CONTROL METHODS

(75) Inventors: Gerald Hearns, Irvine (GB);
Christopher Alan Smith, Leicester (GB); Simon Gray, Leicester (GB);
Matthew James Cunningham, Leicester (GB)

(73) Assignee: GE Energy Power Conversion Technology, Rugby, Warwickshire (GB)

( * ) Notice: Subject to any disclaimer, the term of this patent is extended or adjusted under 35 U.S.C. 154(b) by 105 days.

(21) Appl. No.: 13/245,101

(22) Filed: Sep. 26, 2011

(65) Prior Publication Data

US 2012/0074698 A1 Mar. 29, 2012

(30) Foreign Application Priority Data

Sep. 27, 2010 (EP) .................... 10013241

(51) Int. Cl.
*H02P 9/04* (2006.01)
(52) U.S. Cl.
USPC .......................................... 290/43
(58) Field of Classification Search
USPC ................. 290/43–44, 52–55; 700/286–290
See application file for complete search history.

(56) References Cited

U.S. PATENT DOCUMENTS

| | | | | |
|---|---|---|---|---|
| 4,625,125 A * | 11/1986 | Kuwabara | ...................... | 290/52 |
| 4,673,858 A * | 6/1987 | Saito | .............................. | 318/805 |
| 5,083,039 A * | 1/1992 | Richardson et al. | ............ | 290/44 |
| 6,856,039 B2 * | 2/2005 | Mikhail et al. | ................... | 290/44 |
| 2004/0119292 A1 * | 6/2004 | Datta et al. | ...................... | 290/44 |
| 2009/0147549 A1 * | 6/2009 | Jones et al. | ..................... | 363/37 |
| 2009/0322080 A1 | 12/2009 | Ruiz Minguela et al. | | |

FOREIGN PATENT DOCUMENTS

GB 2467011 A 7/2010

OTHER PUBLICATIONS

European Search Report for Application No. EP10013241 dated Mar. 10, 2011.

\* cited by examiner

*Primary Examiner* — Tulsidas C Patel
*Assistant Examiner* — Sean Gugger
(74) *Attorney, Agent, or Firm* — Parks IP Law LLC; Theodore A. Wood

(57) ABSTRACT

In an oscillating water column (OWC) assembly power may be generated based on a power reference that is derived from an estimate of the available mechanical power in the air turbine 2 or a measured pressure drop across the turbine. The power reference is used to derive a power control torque reference within a power controller 14. A speed controller 16 uses a comparison of a measured speed of the generator 8 and a maximum speed limit to derive a speed control torque reference. A selector function 22 selects whichever of the power control and speed control torque references is the maximum at any time instant. The selected torque reference is input to an anti stall torque function 24 where it is selectively modified by applying a speed dependent gain that decreases with decreasing turbine speed, preferably so that the main torque reference is zero for a minimum speed limit.

18 Claims, 9 Drawing Sheets

POWER CONTROL METHODS

CROSS REFERENCE TO RELATED APPLICATION

This application claims priority to European Patent Application No. 10013241.4 filed Sep. 27, 2010.

FIELD OF THE INVENTION

The present invention relates to power control methods, and in particular to methods for providing increased flexibility for the generation of electrical power from turbine assembly such as an oscillating water column (OWC), for example.

BACKGROUND OF THE INVENTION

It is possible to convert wave energy into electrical energy by using an air turbine to drive the rotor of a generator. One way of converting wave energy is by using an oscillating water column (OWC) assembly that can be located on the shoreline, nearshore or offshore. The OWC assembly typically comprises a wave capture chamber and a duct which extends from the wave capture chamber to the atmosphere. A turbine is located in the duct and has an output shaft that is connected to the rotor of the generator. Waves rising and falling within the wave capture chamber induce an oscillating column of air which drives the turbine as it moves back and forth through the duct. More particularly, as waves rise within the wave capture chamber then air is forced through the duct past the turbine to the atmosphere. As waves fall within the wave capture chamber then air is drawn from the atmosphere through the duct past the turbine.

The turbine is normally designed to turn in the same direction irrespective of the direction of airflow.

The ac frequency that is developed at the stator terminals of the generator (the "stator voltage") is directly proportional to the speed of rotation of the rotor. The voltage at the generator terminals also varies as a function of speed and, depending on the particular type of generator, on the flux level. For optimum energy capture, the speed of rotation of the output shaft of the turbine will vary according to the speed of the airflow driving the blades of the turbine. Matching of the variable voltage and frequency of the generator to the nominally constant voltage and frequency of the power network can be achieved by using a power converter.

SUMMARY OF THE INVENTION

The present invention provides an assembly (e.g. an oscillating water column (OWC) assembly or subsea turbine assembly) comprising: a turbine that is driven to rotate by moving fluid (e.g. an oscillating column of air, tidal flows or water current flows); a generator having a rotor that is driven by an output shaft of the turbine; a power converter; and a controller providing a main torque reference $M_{ref}$ to the power converter to control the torque of the generator; wherein the controller includes: a power reference function block providing a power reference $P_{ref}$ that is derived from an estimate of the available mechanical power in the turbine or a measured pressure drop $\Delta p$ across the turbine; a power controller function block that uses the power reference $P_{ref}$ to derive a power control torque reference $M_{ref}^{Po}$; a speed controller function block that uses a comparison of a measured speed $\omega$ of the generator and a maximum speed limit $\omega_{max}$ to derive a speed control torque reference $M_{ref}^{\omega}$; and wherein the main torque reference $M_{ref}$ is derived from one of the power control and speed control torque references.

In the case of an OCW assembly then the turbine is preferably located in a duct that extends between a wave capture chamber and the atmosphere and has an output shaft that is connected to the rotor of the generator, either directly or by means of a gearbox. Waves rising and falling within the wave capture chamber induce an oscillating column of air which drives the turbine as it moves back and forth through the duct.

The assembly may be located in or adjacent to any body of water including oceans, seas, tidal estuaries, rivers and other waterways etc. where wave energy or fluid flows can be usefully exploited. The turbine may have any suitable construction such as an impulse turbine or a reaction turbine, such as a Well's turbine, for example. In general terms, and irrespective of whether or not the assembly is an OWC assembly, the turbine will typically only turn in one direction regardless of the direction of fluid flow.

The generator may have any suitable construction such as an induction or synchronous generator.

The power converter may have any suitable topology construction and will be used to match the generated power to a supply network or power grid, for example. In one possible arrangement the power converter may include a first active rectifier/inverter electrically connected to the stator terminals of the generator having a plurality of semiconductor switching devices, a second active rectifier/inverter electrically connected to the supply network or power grid having a plurality of semiconductor switching devices, and a dc link connected between the first and second active rectifier/inverters. In this case, it will typically be the first active rectifier/inverter (or generator bridge) that is controlled by the main torque reference $M_{ref}$ to achieve the desired generator torque. The way in which a power converter can be used to control generator torque is well known to the skilled reader and requires no further explanation here. The first and second rectifier/inverters can have any suitable topology. In normal operation the first active rectifier/inverter will operate as a rectifier and the second active rectifier/inverter (or network bridge) will operate as an inverter. The operation of the semiconductor power switching devices in the first active rectifier/inverter can be controlled using gate drive control signals derived in accordance with a conventional pulse width modulation (PWM) strategy.

The controller may further include an anti stall torque limit function block that selectively modifies whichever of the power control and speed control torque references $M_{ref}^{Po}$, $M_{ref}^{\omega}$ is the maximum at any time instant to derive the main torque reference $M_{ref}$ by applying a speed dependent gain that decreases with decreasing turbine speed, preferably so that the main torque reference $M_{ref}$ is zero for a minimum speed limit.

When the power control torque reference $M_{ref}^{Po}$ at any time instant is greater than the speed control torque reference $M_{ref}^{\omega}$ then it is selected and provided as an input to the anti stall torque limit function block or vice versa. If the power control torque reference $M_{ref}^{Po}$ is selected then it is convenient to say that the power controller function block is active and the speed controller function block is inactive or vice versa. However, it will be readily appreciated that the power controller function block and the speed controller function block operate continuously in parallel to provide the power control and speed control torque references $M_{ref}^{Po}$ and $M_{ref}^{\omega}$, respectively. The purpose of the power controller function block is to provide a power control torque reference $M_{ref}^{Po}$ which should enable the generated power, i.e. the electrical power generated by the generator and exported to the supply network or power grid through the power converter, to follow the power reference $P_{ref}$ that is provided by the power reference function block. When the measured speed $\omega$ of the generator (or shaft speed) exceeds or is close to a maximum speed limit $\omega_{max}$ then the speed controller function block will provide a speed control torque reference $M_{ref}^{\omega}$ which should try to bring shaft speed back below the maximum speed limit. It is expected that the generated power will deviate (in some cases quite considerably) from the power reference $P_{ref}$ in situations where the speed controller function block is active or when the anti stall torque limit function is being applied.

The maximum speed limit $\omega_{max}$ used by the speed controller function block is preferably less than the maximum physical speed limit of the turbine since there may be a delay before shaft speed $\omega$ is brought back below the maximum speed limit by the operation of the speed controller function block during which the maximum speed limit will continue to be exceeded. In other words, the speed controller function block should not be relied upon to maintain shaft speed below the maximum physical speed limit of the turbine and a suitable safety margin will be needed. Depending on how the power and speed controller function blocks are configured, and taking into account the operating conditions, the speed controller function block may prevent the maximum speed limit $\omega_{max}$ from ever being reached or may reduce how often or by how much the maximum speed limit is exceeded. In most cases the maximum and minimum speed limits will not be considered to be 'hard' limits and can be exceeded even though the preference is that, on average, the speed of the generator will remain within the speed limits during operation.

If shaft speed $\omega$ is less than the maximum speed limit $\omega_{max}$ then the power control torque reference $M_{ref}^{Po}$ will normally be greater than the speed control torque reference $M_{ref}^{\omega}$. The power controller function block is therefore normally active and the speed controller function block is normally inactive when shaft speed is less than the maximum speed limit. If shaft speed exceeds the maximum speed limit then the speed control torque reference $M_{ref}^{\omega}$ will normally be greater than the power control torque reference $M_{ref}^{Po}$. The speed controller function block is therefore normally active and the power controller function block is normally inactive when shaft speed exceeds the maximum speed limit. However, it is possible for the power controller function block to be active even when shaft speed exceeds the maximum speed limit depending on the power reference $P_{ref}$.

Both the power controller function block and the speed controller function block include a proportional-integral or PI controller with proportional and integral gains. The input to the power controller function block is power and the output is torque so the gains of the PI controller are preferably normalised using the rated speed of the generator. Unity proportional and integral gains may be used. The proportional and integral gains for the speed controller function block can be chosen by matching the closed-loop dynamics to a desired second order model with a natural frequency and damping.

In the case of the power controller function block then the power reference $P_{ref}$ from the power reference function block is preferably compared against an estimate of generated power or a measured generated power (both of which are described in more detail below) and the resulting power signal is used by the PI controller to derive the power control torque reference $M_{ref}^{Po}$. An additional tracking gain is provided by comparing the power control torque reference $M_{ref}^{Po}$ with the main torque reference $M_{ref}$ so that the power controller function block attempts to follow the speed controller function block to ensure that the selector control provides a relatively smooth transition between the power control and speed control torque references. In other words, the power control torque reference $M_{ref}^{Po}$ will continue to track the main torque reference $M_{ref}$ even if the power controller function block is inactive such that the main torque reference is derived from the speed control torque reference $M_{ref}^{\omega}$ that is provided by the speed controller function block. Without the tracking gain the power controller function block would be left in an open-loop mode with the consequence that the integrator would wind up to an undesirable value.

In the case of the speed controller function block then shaft speed $\omega$ is preferably compared against the maximum speed limit $\omega_{max}$ and the resulting speed signal is used by the PI controller to derive the speed control torque reference $M_{ref}^{\omega}$. An additional tracking gain is provided by comparing the speed control torque reference $M_{ref}^{\omega}$ with the main torque reference $M_{ref}$ so that the speed controller function block attempts to follow the power controller function block to ensure that the selector control provides a relatively smooth transition between the power control and speed control torque references. In other words, the speed control torque reference $M_{ref}^{\omega}$ will continue to track the main torque reference $M_{ref}$ even if the speed controller function block is inactive such that the main torque reference is derived from the power control torque reference $M_{ref}^{Po}$ that is provided by the power controller function block. The input to the speed controller function block is speed and the output is torque.

Shaft speed $\omega$ is the only input parameter that is absolutely required by the controller and can be measured by any suitable device such as speed transducer or encoder, for example. In the case of an induction generator then shaft speed can also be determined from the stator frequency and the generator slip speed. The slip frequency represents the relative motion between the rotating field and the rotor of the induction generator and can be calculated from the stator voltage, stator frequency, stator current and the generator parameters.

To prevent the main torque reference $M_{ref}$ from being large enough to stall the turbine, the anti stall torque limit function block selectively modifies whichever of the power control and speed control torque references is the maximum at any time instant by applying a speed dependent gain that increases with increasing turbine speed. At the minimum speed limit the main torque reference $M_{ref}$ that is output by the anti stall torque limit function block is preferably zero. The anti stall torque limit function block is preferably implemented as a look-up table to which shaft speed is used as a pointer. At low shaft speed, i.e. shaft speeds below the minimum speed limit, then the gain is preferably zero and it will be 1 for the start of the normal speed operating range and remain 1 for higher shaft speeds. Between these low and high shaft speed limits then the gain preferably increases in a smooth manner with increasing shaft speed $\omega$ so that there are no 'bumps' in the main torque reference $M_{ref}$. For example:

$$M_{ref} = \text{Stall}(\omega, x_{stall}, y_{stall}) M_{ref}^{max} \tag{EQ1}$$

where:
$M_{ref}^{max}$ is the selected torque reference that is input to the anti stall torque limit function block, and
Stall is a function with example limits:
$x_{stall} = [0, 10, 20, 30, 40, 50, 80, 100]$ rad/s, $y_{stall} = [0, 0, 0.2, 0.6, 1, 1, 1, 1]$ With the example limits given above then for shaft speed less than 10 rad/s the anti stall torque limit function block will apply to the selected torque reference a gain of zero so that the main torque reference that is applied to the power converter will be zero. At shaft speeds between 20 and 40 rad/s then the anti stall torque limit function block will apply to the selected torque reference a gain that increases with increasing shaft speed. At shaft speeds greater than 40 rad/s then the anti stall torque limit function will apply to the selected torque reference a gain of 1 so that the selected torque reference remains unchanged. In other words, the selected torque reference $M_{ref}^{max}$ is not modified by the anti stall torque limit function block for shaft speeds greater than 40 rad/s and the main torque reference is therefore the same as whichever of the power control and speed control torque references $M_{ref}^{Po}$, $M_{ref}^{\omega}$ is selected as being the maximum at the particular time instant.

It will be readily appreciated that the Stall function can have any suitable limits and that they might be dependent on the normal operating range for shaft speed.

The maximum shaft speed is controlled by the speed controller function block and the minimum shaft speed is controlled by the anti stall torque limit function block. Being able to control shaft speed between maximum and minimum limits ensures that the overall operation of the assembly is predictable. It also prevents the turbine from operating at excessive speed where the efficiency is poor or at such low speeds that there is a significant risk of stalling.

The power reference $P_{ref}$ is derived by the power reference function block from operating characteristics of the turbine. In a preferred arrangement the power reference $P_{ref}$ is derived from an estimate of the available mechanical power in the turbine (estimated mechanical power $\tilde{P}_{mech}$). The mechanical power can be estimated using any suitable method depending on the desired control strategy for the assembly. In a first aspect of the power reference function block a torque observer system, typically in the form of a dynamic model-based state estimator, can be used to provide an estimate of the mechanical torque $\tilde{M}_{air}$ from the turbine. The estimated mechanical torque $\tilde{M}_{air}$ may be derived from the measured shaft speed and electrical torque along with the damping torque estimate which is typically a function of shaft speed and the total system inertia. If there is no direct measurement of electrical torque then it is possible to assume that the electrical torque is substantially the same as the main torque reference $M_{ref}$ that is applied to the power converter. An improved estimate of the mechanical torque can be obtained if the efficiency characteristics of the generator are also used by the torque observer system. In this case, the torque observer system may also use an estimate of generated power $\tilde{P}_{gen}$ or a measured generated power $P_{fb}$ (or 'power feedback') if it is available to derive the estimated mechanical torque $\tilde{M}_{air}$. The estimated mechanical torque $\tilde{M}_{air}$ enables the wave period to be calculated so that the power reference function block can be adapted to incoming wave characteristics. By detecting the peaks and troughs of the estimated mechanical torque the period can be calculated which will be half of the incoming wave period. The estimate of the wave period can be used to adapt filter times in the power reference function block.

The estimated mechanical torque $\tilde{M}_{air}$ can be multiplied by shaft speed $\omega$ to provide the estimated mechanical power $\tilde{P}_{mech}$:

$$\tilde{P}_{mech} = \omega \tilde{M}_{air} \tag{EQ2}$$

In a second aspect of the power reference function block the estimated mechanical power $\tilde{P}_{mech}$ can be calculated using a measured pressure drop $\Delta p$ across the turbine, non-dimensional torque characteristics of the turbine $f_M$, air density $\rho$ and the turbine diameter D:

$$\tilde{P}_{mech} = \omega M_{air} = f_M\left(\frac{\Delta p}{\rho \omega^2 D^2}\right) \rho \omega^3 D^5 \tag{EQ3}$$

The second aspect of the power reference function block therefore requires an additional input parameter, namely the measured pressure drop $\Delta p$ across the turbine. The pressure drop $\Delta p$ can be measured using any suitable device such as a pressure transducer, for example.

As stated above, the power reference $P_{ref}$ can be derived from the estimated mechanical power $\tilde{P}_{mech}$ by any suitable method depending on the desired control strategy. For example, the power reference can be based on the instantaneous estimate of the available mechanical power in the turbine (i.e. on the estimated mechanical power at any time instant) such that the power reference is used to demand the maximum instantaneous power, on a moving average of the estimated mechanical power such that the power reference is used to demand a lower more constant power, or on any suitable combination thereof. The way in which the power reference is derived may be fixed for any particular assembly or be capable of being selected or adjusted, either automatically or manually and optionally in 'real time' in response to changing operating parameters or wave conditions, for example.

Demanding a lower more constant or steady-state generated power ensures that power continues to be generated between wave peaks but is subject to the system inertia being sufficient to store energy. The power reference $P_{ref}$ can be adapted to incoming wave characteristics.

In a first aspect the power reference can be derived from the weighted instantaneous estimate of the available mechanical power $\tilde{P}_{mech}$ in the turbine:

$$P_{ref}^{inst} = \alpha_{inst} \tilde{P}_{mech} \tag{EQ4}$$

where:
$P_{ref}^{inst}$ is a First Power Reference Component that can be Used to Derive the Power reference, and
$\alpha_{inst}$ is a weighting which normally would be less than In a second aspect the estimated instantaneous mechanical power or estimated peak power can be passed through one or more moving average filters each with its own weighting. The longer the moving average filter time T then the smaller the weighting should be:

$$P_{ref}^{filt} = \alpha_1 \frac{\int \tilde{P}_{mech} - \tilde{P}_{mech}(t-T_1)dt}{T_1} + \alpha_2 \frac{\int \tilde{P}_{mech} - \hat{P}_{mech}(t-T_2)dt}{T_2} + \alpha_3 \frac{\int \tilde{P}_{mech} - \hat{P}_{mech}(t-T_3)dt}{T_3} \tag{EQ5}$$

where:
$P_{ref}^{filt}$ is a second power reference component that can be used to derive the power reference,
$\alpha_1, \alpha_2, \alpha_3$ are weightings which normally will be less than 1;
$T_1, T_1, T_1$ are the moving average filter times, and
$\hat{P}_{mech}$ is the peak value of the estimated mechanical power for each wave cycle.

In a third aspect the power reference can also be derived by defining a shaft speed to extract maximum power:

$$P_{ref}^{max} = \min\left(\max\left(\left(\frac{\omega - \omega_{power\_max}}{\omega}\right), 0\right), 1\right) \tilde{P}_{mech} \tag{EQ6}$$

where:
$P_{ref}^{max}$ is a third power reference component that can be used to derive the power reference, and
$\omega_{power\_max}$ is the shaft speed at which maximum power can be extracted.

The power reference $P_{ref}$ that is provided to the power controller function block can be derived from any one of the first, second and third power reference components mentioned above, or any suitable combination thereof. For example:

$$P_{ref} = P_{ref}^{inst} + P_{ref}^{filt} + P_{ref}^{max} \quad (EQ7)$$

The power reference $P_{ref}$ can be used to shape the generated power without being critical to the overall performance of the control strategy because the shaft speed can be maintained within maximum and minimum limits by the speed controller function block and the anti stall torque limit function block, respectively. In other words, the control strategy can compensate if the power reference $P_{ref}$ is too large or too small. The power reference $P_{ref}$ will always be limited to be less than or equal to the rated power of the generator and with sensible weightings the power reference should also be less than the instantaneous available mechanical power.

Both the power controller function block and the torque observer system may use an estimate of generated power $\tilde{P}_{gen}$ or a measured generated power $P_{fb}$. The generated power at the network side of the power converter may be measured by any suitable device. Otherwise, generated power can be estimated using the generator characteristics and the main torque reference $M_{ref}$.

The present invention further provides a control strategy for an assembly comprising: a turbine that is driven to rotate by moving fluid; a generator having a rotor that is driven by an output shaft of the turbine; a power converter; and a controller providing a main torque reference $M_{ref}$ to the power converter to control the torque of the generator; wherein the control strategy includes the steps of: providing a power reference $P_{ref}$ that is derived from an estimate of the available mechanical power in the turbine or a measured pressure drop ($\Delta p$) across the turbine; using the power reference $P_{ref}$ to derive a power control torque reference $M_{ref}^{Po}$; using a comparison of a measured speed $\omega$ of the generator and a maximum speed limit $\omega_{max}$ to derive a speed control torque reference $M_{ref}^{\omega}$; and deriving the main torque reference $M_{ref}$ from one of the power control and speed control torque references $M_{ref}^{Po}$, $M_{ref}^{\omega}$.

The control strategy may further include the step of selectively modifying whichever of the power control and speed control torque references $M_{ref}^{Po}, M_{ref}^{\omega}$ is the maximum at any time instant to derive the main torque reference $M_{ref}$ by applying a speed dependent gain that decreases with decreasing turbine speed, preferably so that the main torque reference $M_{ref}$ is zero for a minimum speed limit.

Further aspects of the control strategy are as outlined generally above.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
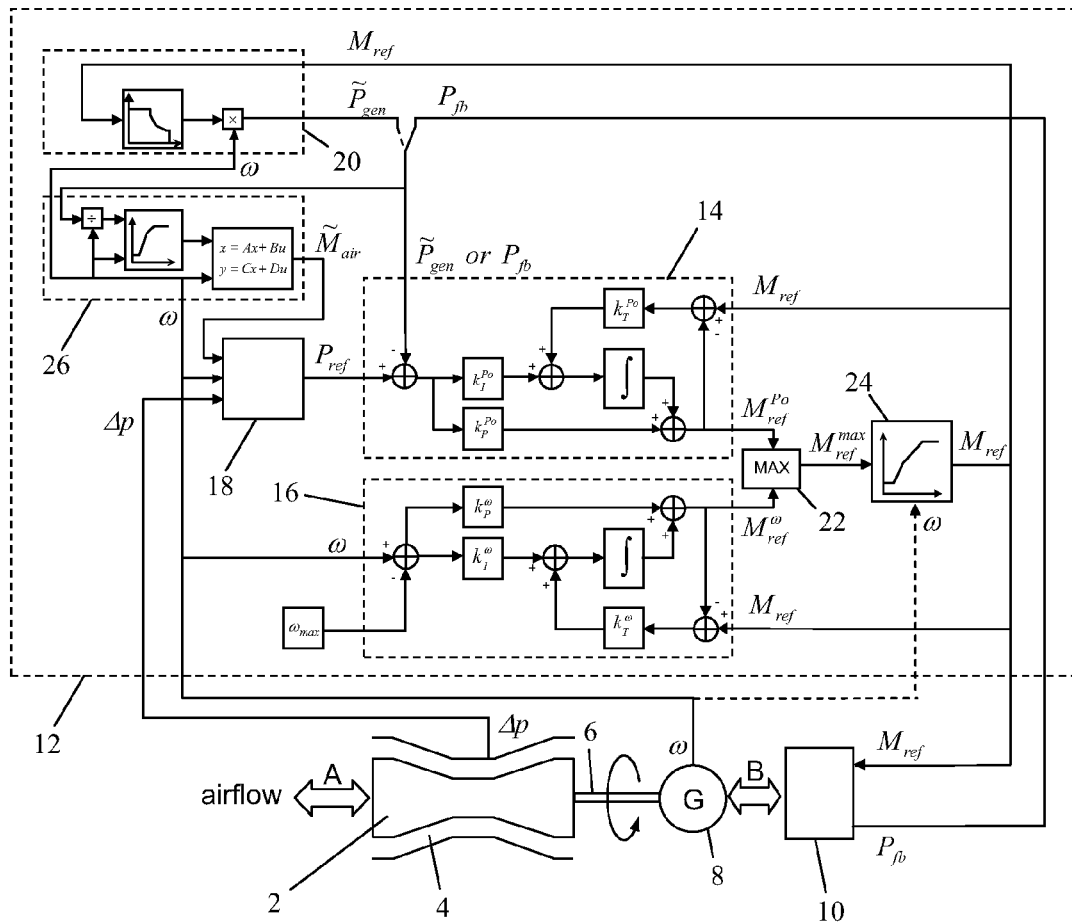
FIG. 1 is a schematic diagram showing a controller for an oscillating water column (OWC) assembly according to the present invention.

Description of the Assembly:

With reference to FIG. 1 an oscillating water column (OWC) assembly that can be mounted on an off-shore platform, on land or installed in a harbour wall, for example, includes a turbine 2 that is located in a duct 4. A first end of the duct 4 is connected to a wave capture chamber (not shown) and a second end of the duct is connected to the atmosphere. The turbine 2 has an output shaft 6 that drives the rotor of a generator 8. Waves rising and falling within the wave capture chamber (not shown) induce an oscillating column of air which is represented in FIG. 1 by the arrow A. This oscillating column of air drives the turbine 2 to rotate as it moves back and forth through the duct 4. The turbine 2 is designed to turn in the same direction irrespective of the direction of airflow.

Although the specific description has concentrated on an OWC assembly it will be readily appreciated that the control strategy and controller of the present invention can be used with any suitable assembly where the turbine is driven to rotate by moving fluid.

Description of the Controller:

The stator terminals of the generator 8 are connected to a power converter 10 which is used to interface the generator to a supply network or power grid (not shown), optionally by means of an undersea transmission cable if the OWC assembly is mounted on an off-shore platform. Although not shown, the power converter comprises a generator bridge which has ac terminals connected to the stator terminals. In normal operation of the OWC assembly the generator bridge operates as an active rectifier to supply power to a dc link. The generator bridge has a conventional three-phase two-level topology with a series of semiconductor power switching devices fully controlled and regulated using a pulse width modulation (PWM) strategy. However, in practice the generator bridge can have any suitable topology such a three-level neutral point clamped topology or a multi-level topology (Foch-Maynard arrangement, for example). The dc output voltage of the generator bridge is fed to the dc terminals of a network bridge which in normal operation operates as an inverter. The network bridge has a similar three-phase two-level topology to the generator bridge with a series of semiconductor power switching devices fully-controlled and regulated using a PWM strategy. However, in practice the network bridge can have any suitable topology, as discussed above for the generator bridge. It will be readily appreciated that there may be times when it might be necessary or desirable to supply power can be supplied from the supply network to the generator 8 through the network bridge operating as an active rectifier and the generator bridge operating as an inverter. In other words, the power converter 10 is typically capable of bi-directional power flow. The power flow between the generator 8 and the power converter 10 is represented in FIG. 1 by the arrow B. Suitable filter arrangements and protective switchgear may be provided between the power converter and the supply network.

The generator torque is controlled by providing a main torque reference $M_{ref}$ to the power converter 10, and more particularly to the generator bridge or its associated controller (e.g. by conventional q-axis control techniques). The main torque reference $M_{ref}$ is derived by a main controller 12. The main controller 12 has only one required input parameter, which is the measured speed of the generator 8 (shaft speed $\omega$), but two additional input parameters include the measured pressure drop $\Delta p$ across the turbine 2 and a measured generated power $P_{fb}$ can optionally be provided. The pressure drop is measured by a pressure transducer (not shown). The generated power (i.e. the amount of power that is being exported to the supply network through the power converter 10) is calculated by the power converter 10 or optionally measured by any suitable means.

The main controller 12 comprises a power controller 14 and a speed controller 16.

The power controller 14 receives a power reference $P_{ref}$ from a power reference function 18 that is described in more detail below. The power controller 14 includes a PI controller with proportional and integral gains $k_P^{Po}$ and $k_I^{Po}$, respectively. The power reference $P_{ref}$ is compared against the measured generated power $P_{fb}$ or, if that is not available, an estimate of generated power is $\tilde{P}_{gen}$ that is derived by a generated power function 20, and the resulting power signal is applied to the PI controller. The output of the PI controller is a power control torque reference $M_{ref}^{Po}$.

The generated power function 20 determines an estimate of generated power $\tilde{P}_{gen}$ based on the main torque reference $M_{ref}$, characteristics of the generator 8, rated speed, rated power, and shaft speed $\omega$. The main torque reference $M_{ref}$ is used as a pointer to a look-up table of generator characteristics and the output from the look-up table is then multiplied by shaft speed.

The PI controller includes an additional tracking gain $k_T^{Po}$ which is derived from a comparison of the power control torque reference $M_{ref}^{Po}$ and the main torque reference $M_{ref}$. The additional tracking gain $K_T^{Po}$ ensures that the power control torque reference $M_{ref}^{Po}$ attempts to track the main torque reference $M_{ref}$ even if the power controller 14 is inactive as described in more detail below.

The speed controller 16 receives a measured shaft speed $\omega$. The speed controller 16 includes a PI controller with proportional and integral gains $k_P^{\omega}$ and $k_I^{\omega}$, respectively. The shaft speed $\omega$ is compared against a maximum speed limit $\omega_{max}$, which is less than the physical maximum speed limit of the turbine 2 by a predetermined safety margin, and the resulting speed signal is applied to the PI controller. The output of the PI controller is a speed control torque reference $M_{ref}^{\omega}$.

The PI controller includes an additional tracking gain $k_T^{\omega}$ which is derived from a comparison of the speed control torque reference $M_{ref}^{\omega}$ and the main torque reference $M_{ref}$. The additional tracking gain $k_T^{\omega}$ ensures that the speed control torque reference $M_{ref}^{\omega}$ attempts to track the main torque reference $M_{ref}$ even if the speed controller 16 is inactive as described in more detail below.

The power control and speed control torque references $M_{ref}^{Po}$, $M_{ref}^{\omega}$ are applied to a selector function 22 which selects whichever torque reference is the maximum at any time instant. If the power control torque reference $M_{ref}^{Po}$ is selected then it is convenient to say that the power controller 14 is active and the speed controller 16 is inactive or vice versa. However, it will be readily appreciated that the power controller 14 and the speed controller 16 operate continuously in parallel to provide the power control and speed control torque references $M_{ref}^{Po}$ and $M_{ref}^{\omega}$, respectively. The additional tracking gains $k_T^{Po}$, $K_T^{\omega}$ used by the PI controllers ensure that the controller integrators are never left in open-loop mode (they are always closed-loop and therefore stable) there is a relatively smooth transition between the power control and speed control torque references. This is because the power control torque reference $M_{ref}^{Po}$ that is provided by the speed controller 16 will attempt to track the main torque reference $M_{ref}$ even if the speed controller is inactive and the main torque reference is derived from the speed control torque reference $M_{ref}^{\omega}$ that is provided by the speed controller 16 or vice versa.

If shaft speed $\omega$ is less than the maximum speed limit $\omega_{max}$ then the power control torque reference $M_{ref}^{Po}$ will normally be greater than the speed control torque reference $M_{ref}^{\omega}$. The power controller 14 is therefore normally active and the speed controller 16 is normally inactive when shaft speed is less than the maximum speed limit. If shaft speed exceeds the maximum speed limit then the speed control torque reference $M_{ref}^{\omega}$ will normally be greater than the power control torque reference $M_{ref}^{Po}$. The speed controller 16 is therefore normally active and the power controller 14 is normally inactive when shaft speed exceeds the maximum speed limit. However, it is possible for the power controller 16 to be active even when shaft speed exceeds the maximum speed limit (or for the speed controller 16 to be active even when the shaft speed is below the maximum speed limit) depending on the power reference $P_{ref}$ that is provided by the power reference controller 18.

The selected torque reference $M_{ref}^{max}$ is input to an anti stall torque limit function 24. The purpose of the anti stall torque limit function 24 is to prevent the main torque reference $M_{ref}$ that is applied to the power converter 10 from being large enough to stall the turbine 2. To try and maintain shaft speed above a minimum speed limit the anti stall torque limit function 24 selectively modifies the selected torque reference $M_{ref}^{max}$ by applying a speed dependent gain that increases with increasing turbine speed. At the minimum speed limit the main torque reference $M_{ref}$ that is output by the anti stall torque limit function 24 is close to zero. The anti stall torque limit function 24 is a look-up table to which shaft speed is used as a pointer. At low shaft speed, i.e. shaft speeds below the minimum speed limit, then the gain is preferably zero and at higher shaft speeds, i.e. shaft speeds considered to be within the normal operating range, the gain is 1. Between these low and high shaft speed limits then the gain preferably increases in a smooth manner with increasing shaft speed ω so that there are no 'bumps' in the main torque reference $M_{ref}$.

The power reference $P_{ref}$ is derived by the power reference function 18 from an estimate of the available mechanical power in the turbine (estimated mechanical power $\tilde{P}_{mech}$).

In a first aspect the estimated mechanical power $\tilde{P}_{mech}$ is determined from EQ2 where the estimated mechanical torque $\tilde{M}_{air}$ is derived using a torque observer system 26. The torque observer system 26 may use the measured generated power $P_{fb}$ or the estimated generated power $\tilde{P}_{gen}$ provided by the generated power function 20 which is divided by shaft speed and used as a pointer to a look-up table of generator efficiency characteristics. Shaft speed is used as a separate pointer to the same look-up table. The outputs of the look-up table and the measured shaft speed are then provided to the torque observer system 26 which is provided in the form of a dynamic model-based state estimator. The primary model parameter in the state estimator is the total system inertia.

In a second aspect the estimated mechanical power $\tilde{P}_{mech}$ is calculated from EQ3 but this requires the measured pressure drop $\Delta p$ across the turbine to be an input parameter to the main controller 12. If there is an available pressure measurement then it can be used but it is not essential since the torque observer can always provide an estimate of the mechanical power.

The power reference $P_{ref}$ is then derived by the power reference function 18 using EQ4 to EQ7 and provided to the power controller 14. The power reference $P_{ref}$ can be used to shape the generated power without being critical to the overall performance of the control strategy because the shaft speed can be maintained within maximum and minimum limits by the speed controller 14 and the anti stall torque limit function 24, respectively. In other words, the control strategy can compensate if the power reference $P_{ref}$ provided by the power reference function 18 is too large or too small.

FIGS. 2 to 9 show some specific, but not necessarily practical, examples of how the main controller 12 can be used to provide a main torque reference $P_{ref}$ and by controlling generator torque determine the amount of electrical power that is exported to the supply network. It should be noted that the proposed control strategies are designed to give flexibility to extract electrical power and do not necessarily need to work in an optimal manner.

Example 1

Figure 2:
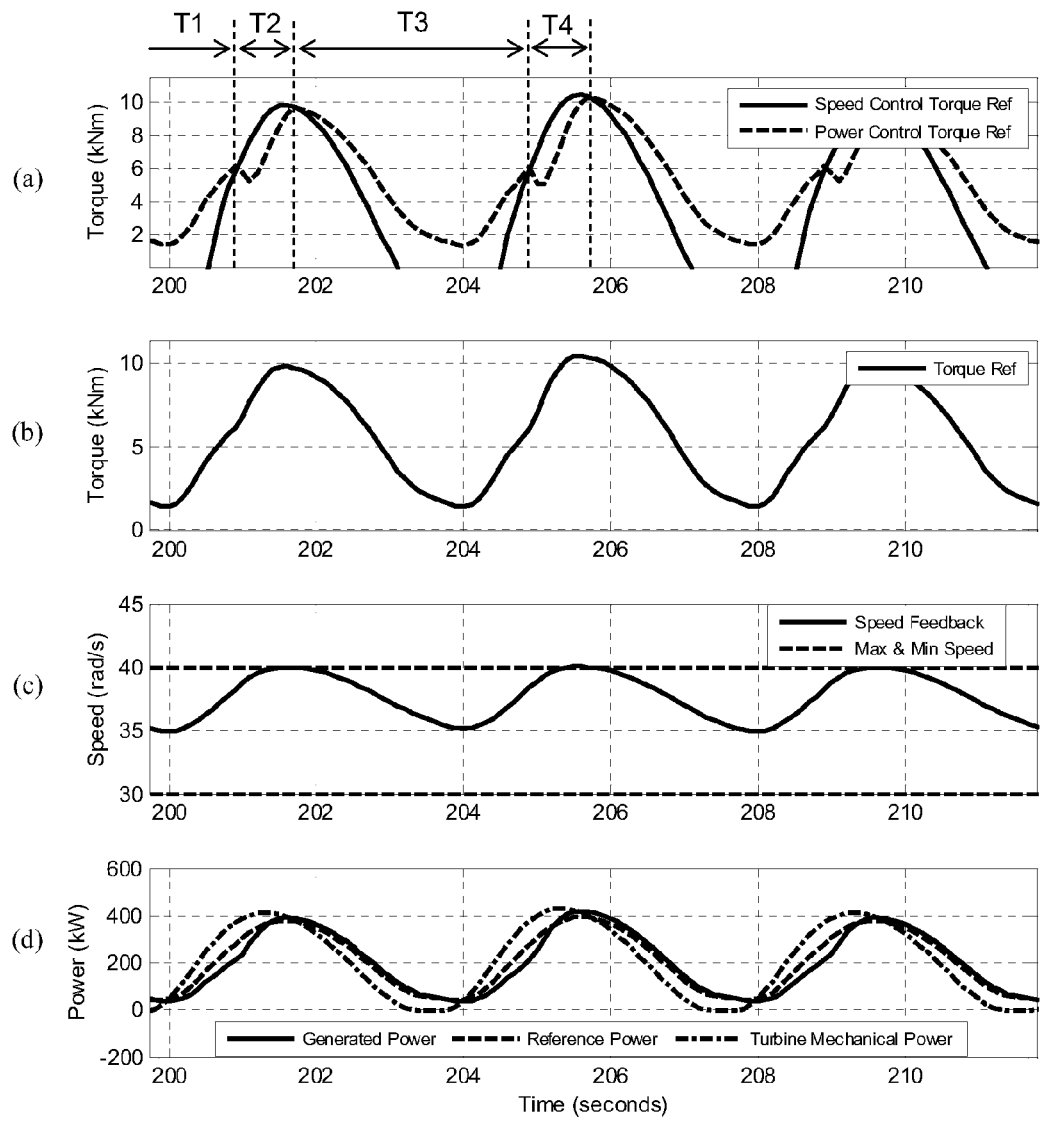
FIG. 2 is a series of graphs for a constant frequency sinusoidal wave showing torque references, shaft speed and power for a controller where the power reference $P_{ref}$ is equal to the instantaneous estimated mechanical power $\tilde{P}_{mech}$ of the turbine and with a minimum speed limit of 30 rad/s and a maximum speed limit of 40 rad/s.
Figure 3:
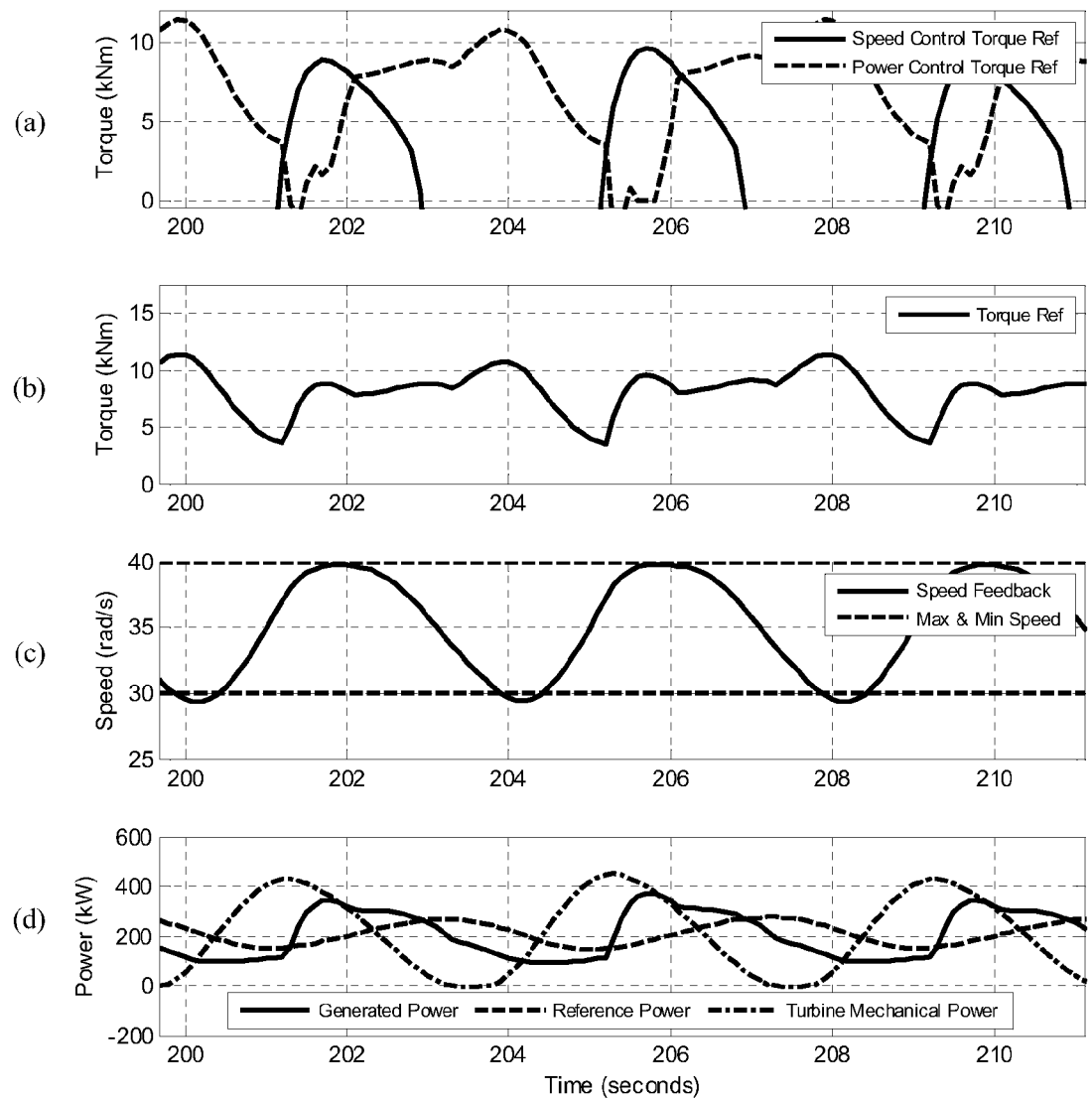
FIG. 3 is a series of graphs for a constant frequency sinusoidal wave showing torque references, shaft speed and power for a controller where the power reference $P_{ref}$ is the moving average of the estimated mechanical power $\tilde{P}_{mech}$ of the turbine over a 3 s window and with a minimum speed limit of 30 rad/s and a maximum speed limit of 40 rad/s.

Example 1 illustrates a situation where the turbine 2 of the OWC is being driven by airflows that are derived from sinusoidal waves of constant frequency. Graph (a) of FIG. 2 shows the power control and speed control torque references $M_{ref}^{Po}$, $M_{ref}^{\omega}$ that are generated by the power controller 14 and speed controller 16, respectively, over a certain period of time. Graph (b) of FIG. 2 shows the torque reference $M_{ref}^{max}$ which is selected by the selector function 22, i.e. the selected torque reference is whichever of the power control and speed control torque references $M_{ref}^{Po}$, $M_{ref}^{\omega}$ is the maximum at any time instant. This will be readily appreciated by the skilled reader by comparing graphs (a) and (b) of FIG. 2. For example, during time periods T1 and T3 the power control torque reference $M_{ref}^{Po}$ is greater than the speed control torque reference $M_{ref}^{\omega}$ so the selected torque reference $M_{ref}^{max}$ follows the power control torque reference, during time periods T2 and T4 the speed control torque reference is greater than the power control torque reference so the selected torque reference follows the speed control torque reference, and so on. The selected torque reference $M_{ref}^{max}$ is supplied to the anti stall torque limit function 24 which derives the main torque reference $M_{ref}$ that is then applied to the power converter 10.

Graph (c) of FIG. 2 shows the measured speed of the generator 8 (shaft speed w) or the 'speed feedback'. The speed varies with the airflows that are generated by sinusoidal waves of constant frequency and follows a similar sinusoidal curve. A maximum speed limit $\omega_{max}$ of 40 rad/s is set. A minimum speed limit of 30 rad/s is also set and represents the speed below which the selected torque reference $M_{ref}^{max}$ will be modified by the anti stall torque limit function 24. It can be seen from graph (c) of FIG. 2 that the minimum speed limit of 30 rad/s is never reached and so the main torque reference $M_{ref}$ corresponds directly to the selected torque reference $M_{ref}^{max}$ and hence to whichever of the power control and speed control torque references $M_{ref}^{Po}$, $M_{ref}^{\omega}$ is the maximum at any time instant. When the shaft speed is below the maximum speed limit (e.g. during time periods T1 and T3) then the power control torque reference $M_{ref}^{Po}$ is greater than the speed control torque reference $M_{ref}^{\omega}$. When the shaft speed exceeds the maximum speed limit (e.g. during time periods T2 and T4) then the speed control torque reference $M_{ref}^{\omega}$ is greater than the power control torque reference $M_{ref}^{Po}$. The speed control torque reference $M_{ref}^{\omega}$ is therefore selected and applied to the power converter as the main torque reference $M_{ref}$ during time periods T2 and T4. Generator torque is therefore controlled during time periods T2 and T4 to reduce shaft speed below the maximum speed limit of 40 rad/s.

Graph (d) of FIG. 2 shows the measured generated power $P_{fb}$, the actual mechanical power of the turbine (the 'turbine mechanical power') which is estimated by the state estimator and the power reference $P_{ref}$ (the 'reference power') that is derived by the power reference function 18 and provided to the power controller 14. It is important to note that the actual turbine mechanical power is not the same as the estimated mechanical power $\tilde{P}_{mech}$ that is described in more detail above and which lags behind the turbine mechanical power. In this example, the power reference $P_{ref}$ is substantially equal to the instantaneous estimated turbine mechanical power $\tilde{P}_{mech}$. It will be noted that the measured generated power $P_{fb}$ approaches zero when the turbine mechanical power is zero and approaches a maximum of about 400 kW when the turbine mechanical power is at a maximum. During periods T1 and T3 when the power controller 14 is active the measured generated power $P_{fb}$ follows the power reference $P_{ref}$. When the shaft speed approaches the maximum speed limit and the speed controller 16 is active (e.g. during time period T2 and T4) the measured generated power $P_{fb}$ exceeds the power reference $P_{ref}$.

Example 2

Example 2 illustrates a situation where the turbine 2 of the OWC is being driven by airflows that are generated by sinusoidal waves of constant frequency. However, unlike Example 1 the power reference $P_{ref}$ is the moving average of the estimated mechanical power $\tilde{P}_{mech}$ of the turbine over a 3 s window and is not equal to the instantaneous estimated mechanical power. It can be seen from graph (c) of FIG. 3 that the minimum speed limit of 30 rad/s is reached when the mechanical power input is low (see graph (d) as described below) and the energy stored in the system inertia has been exhausted.

It will be noted that the measured generated power $P_{fb}$ does not fall below 100 kW even when the actual turbine mechanical power is zero. The relationship between the measured generated power $P_{fb}$ and the power reference $P_{ref}$ is closest during those periods where the power controller 14 is active and the measured generated power deviates from the power reference when the shaft speed is greater than the maximum shaft speed and the speed controller 16 is active and when the shaft speed is less than the minimum shaft speed of 30 rad/s.

Examples 1 and 2 show that the way in which the power reference $P_{ref}$ is calculated has a significant effect on the power control torque reference $M_{ref}^{Po}$ that is derived by the power controller 14 and hence on the way in which generator torque is controlled by the power converter 10 to extract electrical power from the generator 4. In Example 1 the power reference $P_{ref}$ is based on the instantaneous estimated mechanical power $\tilde{P}_{mech}$ so that maximum instantaneous electrical power at any time instant is demanded while in Example 2 the power reference is based on a moving average of the estimated mechanical power so that a lower, but more constant or steady-state, amount of electrical power is demanded.

Example 3

Figure 4:
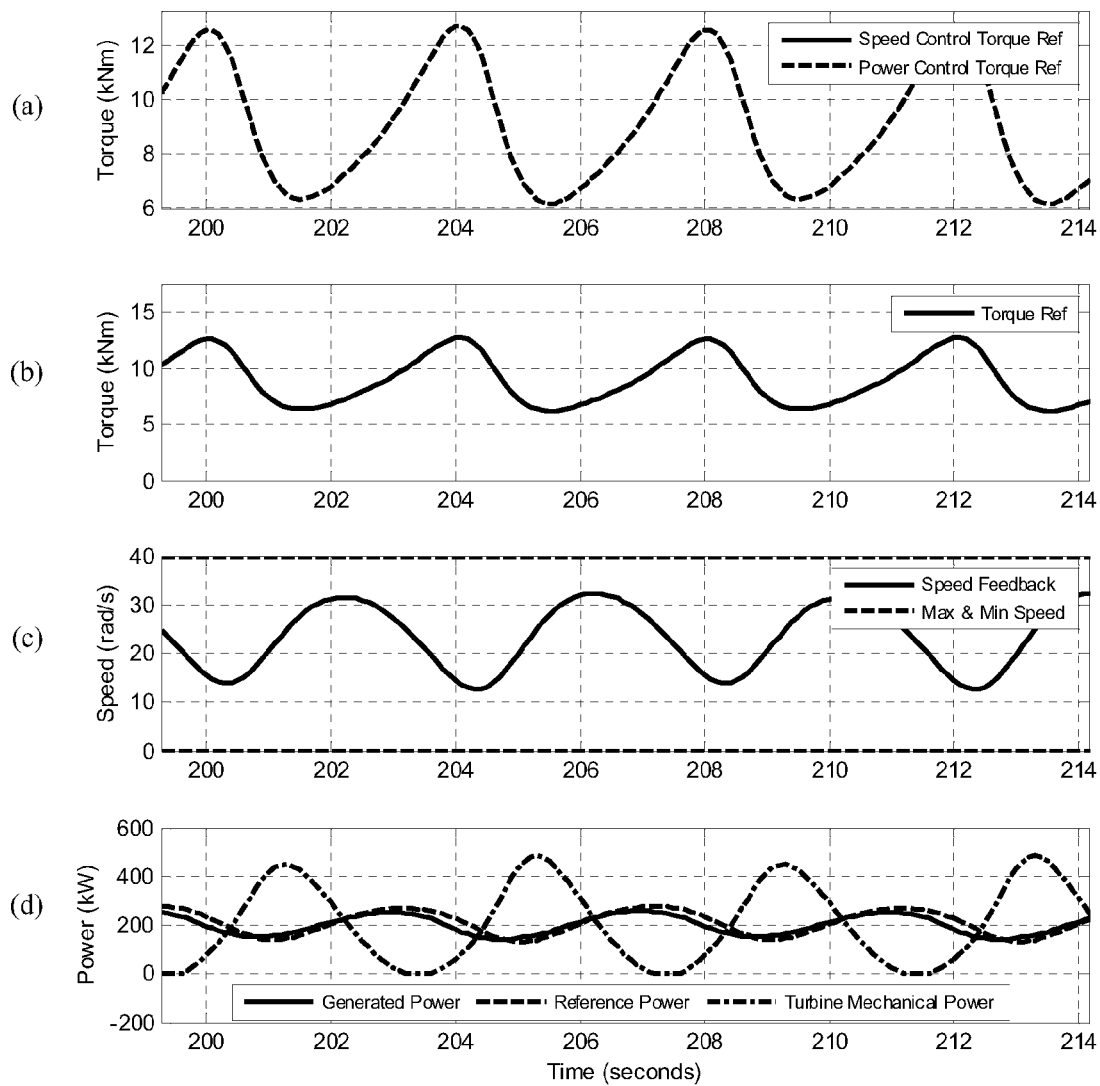
FIG. 4 is a series of graphs for a constant frequency sinusoidal wave showing torque references, shaft speed and power for a controller where the power reference $P_{ref}$ is the moving average of the estimated mechanical power $\tilde{P}_{mech}$ of the turbine over a 3 s window and with a maximum speed limit of 40 rad/s but no minimum speed limit.

Example 3 illustrates a situation where the turbine 2 of the OWC is being driven by airflows that are generated by sinusoidal waves of constant frequency. Like Example 2 the power reference $P_{ref}$ is the moving average of the estimated mechanical power $\tilde{P}_{mech}$ of the turbine over a 3 s window. However unlike Example 2 there is no minimum speed limit. Graph (c) of FIG. 4 shows that the turbine now operates over a speed range that does not approach the maximum speed limit so only the power controller 14 is active.

Example 4

Figure 5:
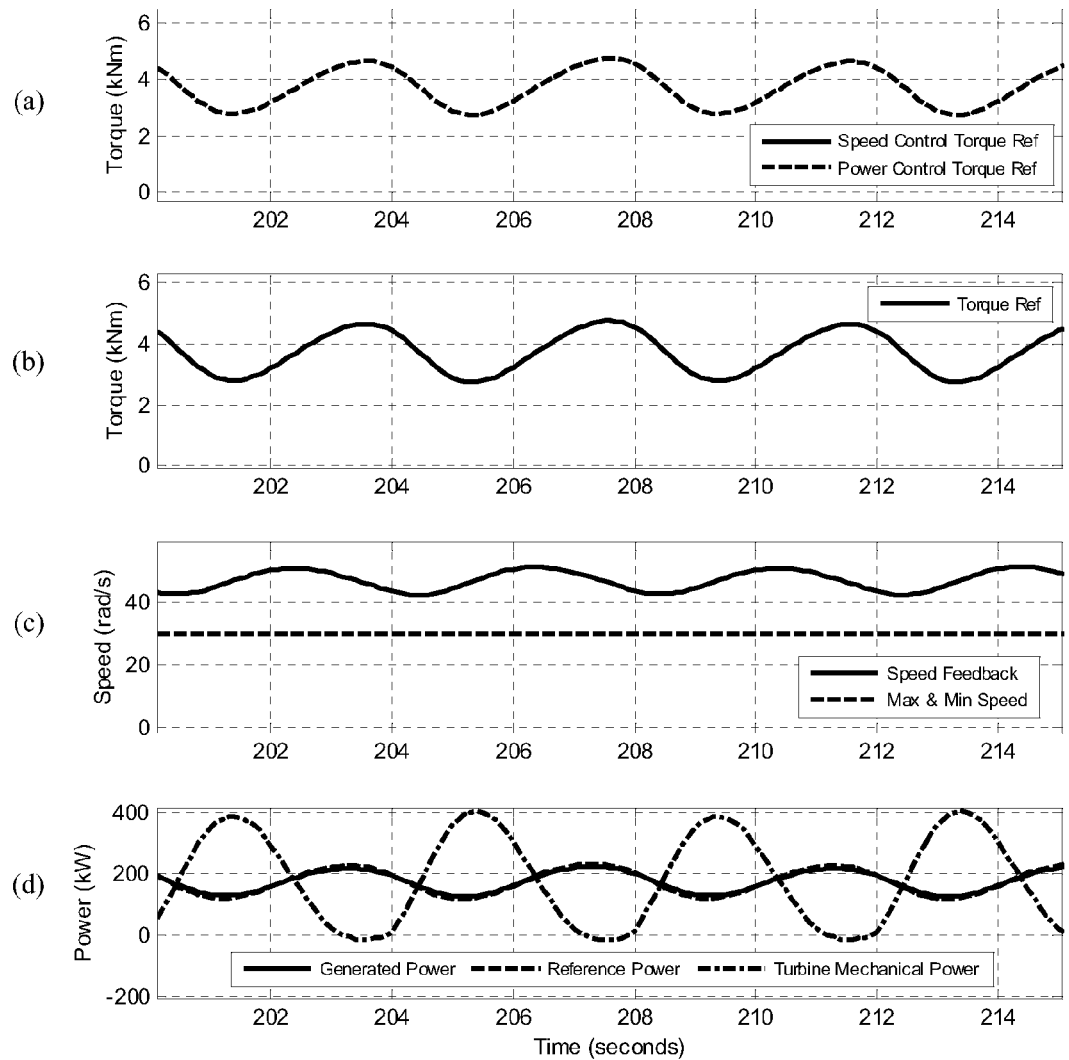
FIG. 5 is a series of graphs for a constant frequency sinusoidal wave showing torque references, shaft speed and power for a controller where the power reference $P_{ref}$ is the moving average of the estimated mechanical power $\tilde{P}_{mech}$ of the turbine over a 3 s window and with a minimum speed limit of 30 rad/s but no maximum speed limit.

Example 4 illustrates a situation where the turbine 2 of the OWC is being driven by airflows that are generated by sinusoidal waves of constant frequency. Like Examples 2 and 3 the power reference $P_{ref}$ is the moving average of the estimated mechanical power $\tilde{P}_{mech}$ of the turbine over a 3 s window. However unlike Examples 2 and 3 there is no maximum speed limit. Graph (c) of FIG. 5 shows that the turbine now operates over a speed range that exceeds the optimal speed (perhaps even approaching the maximum physical speed limit of the turbine) and without the speed controller 16 being active then the only way to influence speed is by means of the power reference $P_{ref}$. This example shows that by setting a maximum speed limit and having an active speed controller 16 means that the choice of the power reference $P_{ref}$ is less critical to the operation of the main controller 12.

Example 5

Figure 6:
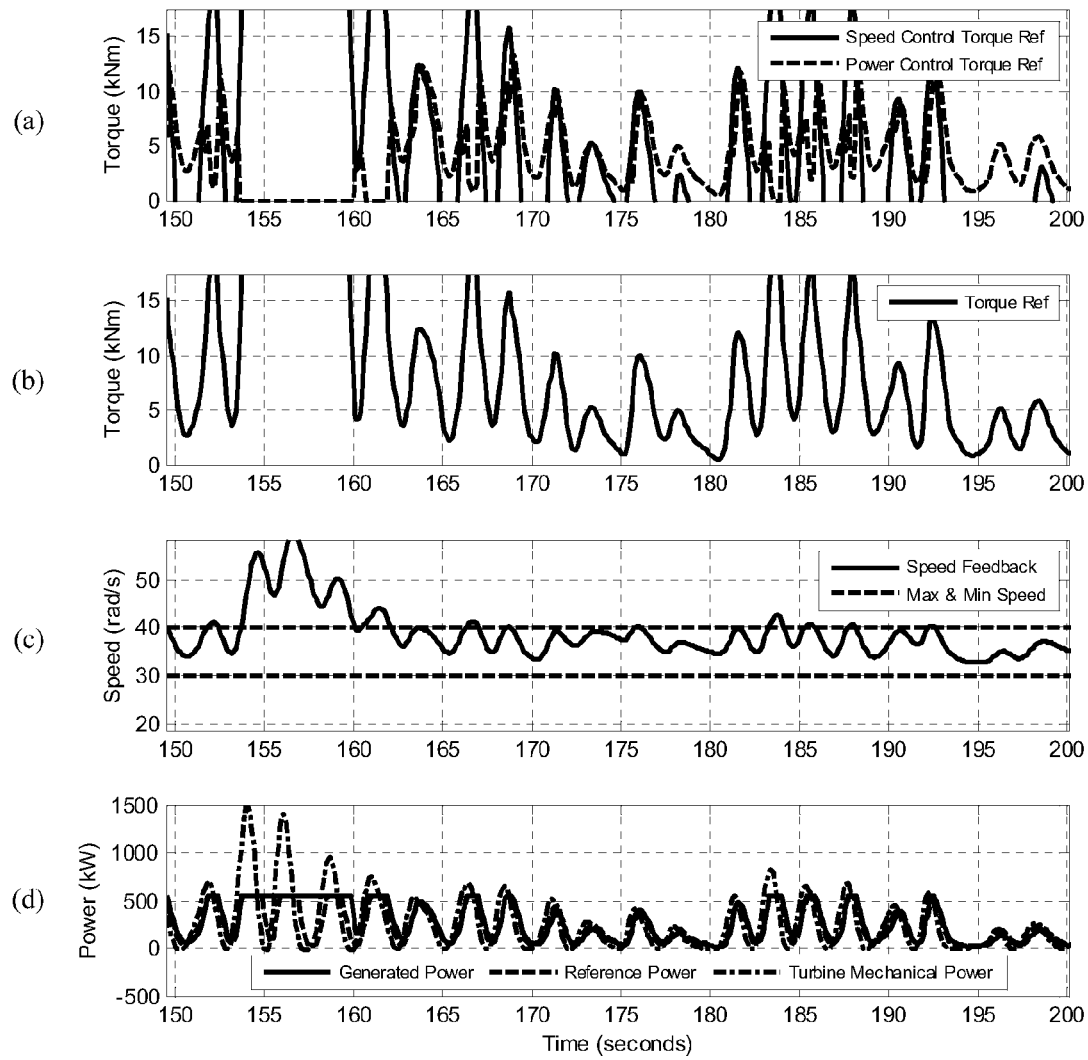
FIG. 6 is a series of graphs for a polychromatic wave showing torque references, shaft speed and power for a controller where the power reference $P_{ref}$ is equal to the instantaneous estimated mechanical power $\tilde{P}_{mech}$ of the turbine and with a minimum speed limit of 30 rad/s and a maximum speed limit of 40 rad/s.

Example 5 illustrates a situation where the turbine 2 of the OWC is being driven by airflows that are generated by polychromatic waves. The power reference $P_{ref}$ is equal to the instantaneous turbine mechanical power. Graph (d) of FIG. 6 shows that the shaft speed exceeds the maximum speed limit of 40 rad/s when the actual turbine mechanical power exceeds the rated power of the generator 4.

Example 6

Figure 7:
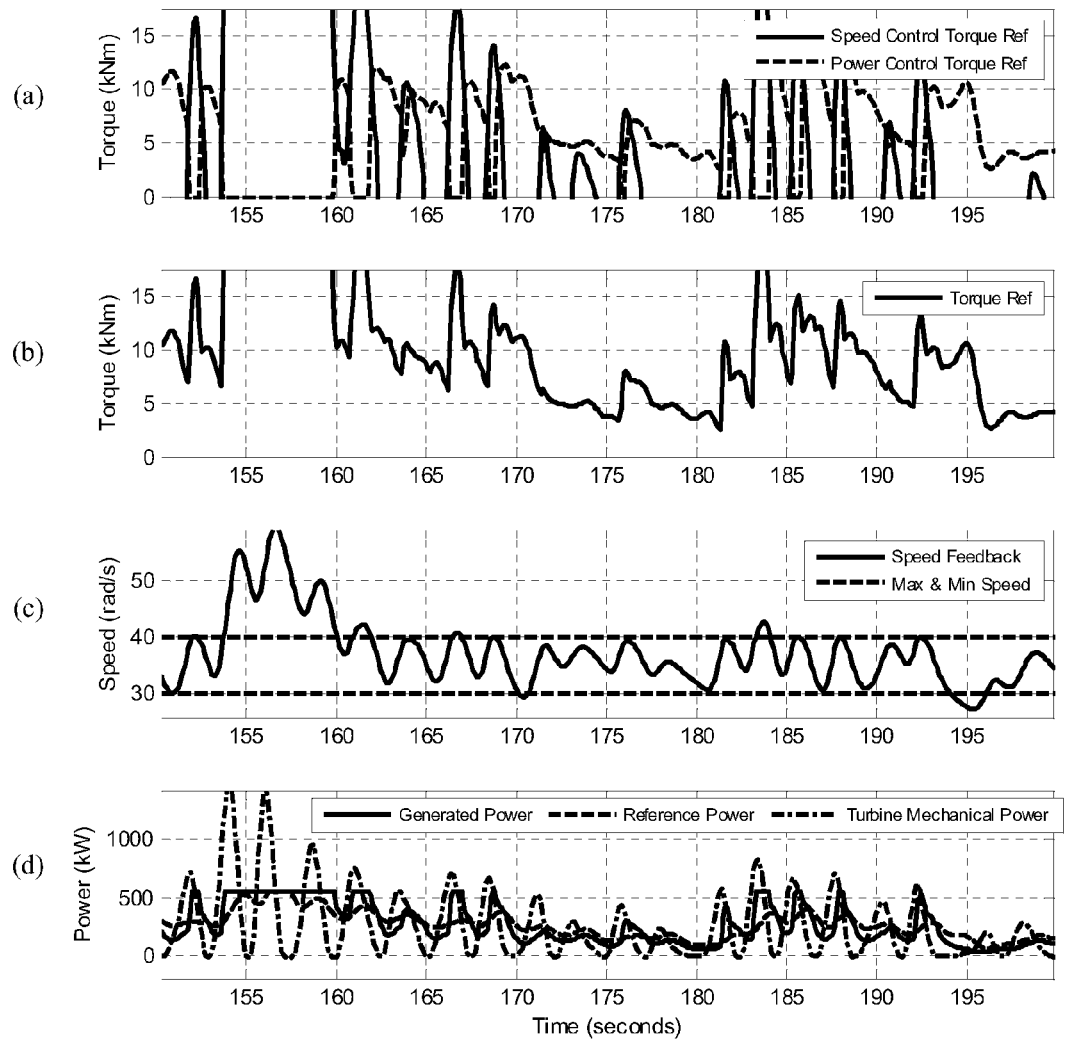
FIG. 7 is a series of graphs for a polychromatic wave showing torque references, shaft speed and power for a controller where the power reference $P_{ref}$ is the moving average of the estimated mechanical power $\tilde{P}_{mech}$ of the turbine over a 3 s window and with a minimum speed limit of 30 rad/s and a maximum speed limit of 40 rad/s.

Example 6 illustrates a situation where the turbine 2 of the OWC is being driven by airflows that are generated by polychromatic waves. However, unlike Example 5, the power reference $P_{ref}$ is the moving average of the estimated mechanical power $\tilde{P}_{mech}$ of the turbine over a 3 s window and is not equal to the instantaneous estimated mechanical power. In Example 6 the main controller 12 attempts to extract a more constant level of electrical power so the shaft speed gets pushed closer to the minimum speed limit of 30 rad/s. Nevertheless, graph (c) of FIG. 7 shows that the turbine does not stall even for periods of low wave energy input.

Example 7

Figure 8:
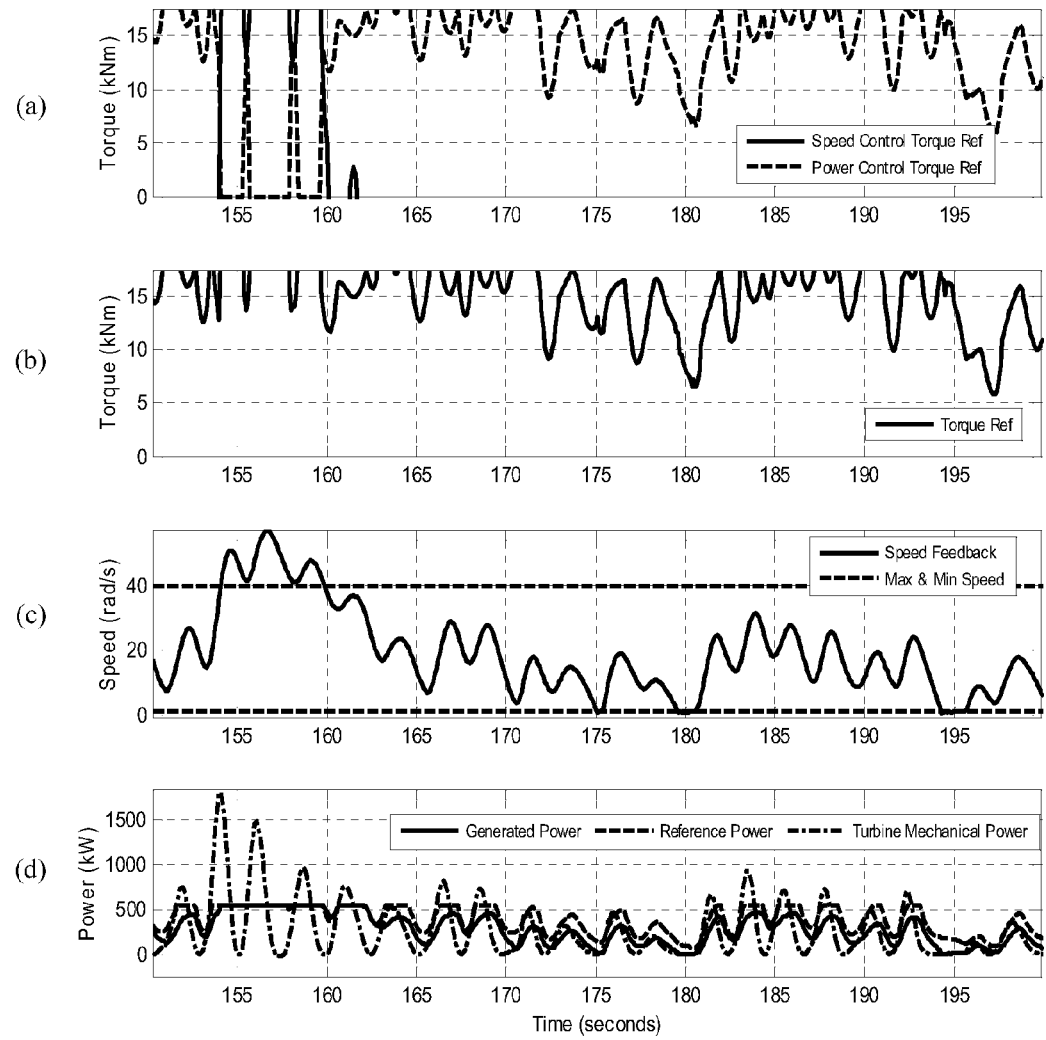
FIG. 8 is a series of graphs for a polychromatic wave showing torque references, shaft speed and power for a controller where the power reference $P_{ref}$ is the moving average of the estimated mechanical power $\tilde{P}_{mech}$ of the turbine over a 3 s window and with a minimum speed limit of 1 rad/s and a maximum speed limit of 40 rad/s.
Figure 9:
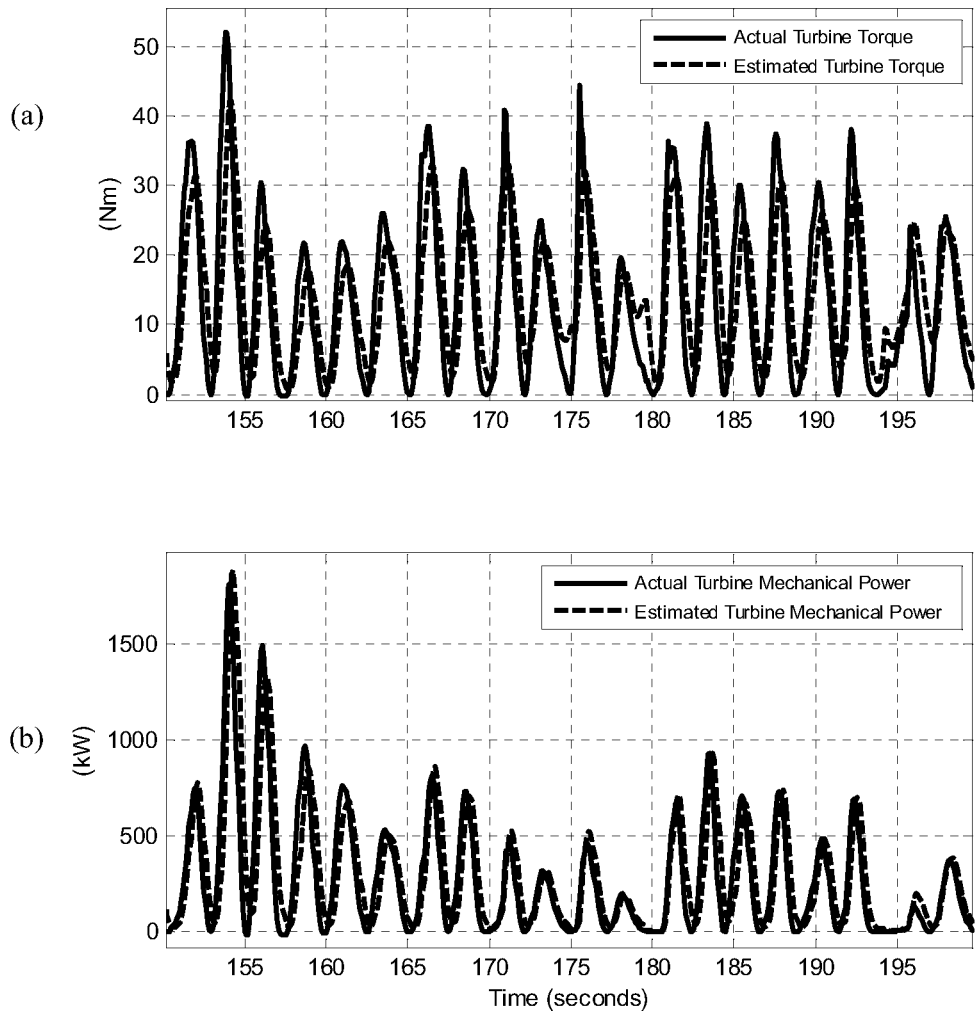
FIG. 9 is a series of graphs showing the actual and estimated mechanical turbine torque and power for the polychromatic wave example shown in FIG. 8.

Example 7 illustrates a situation where the turbine 2 of the OWC is being driven by airflows that are generated by polychromatic waves. Like Example 6 the power reference $P_{ref}$ is the moving average of the estimated mechanical power $\tilde{P}_{mech}$ of the turbine over a 3 s window. However, unlike Example 6 the minimum speed limit is 1 rad/s and not 30 rad/s. Graphs (c) and (d) of FIG. 8 show that when the wave energy input drops, the power reference $P_{ref}$ will come close to stalling the turbine because it lags behind the turbine mechanical power. The combination of the maximum speed control that is applied by the speed controller 16 and the anti stall torque limit function 24 is important and can regulate shaft speed over an acceptable range while the power control extracts the desired electrical power. FIG. 9 (a) shows the actual turbine torque and the estimated turbine torque $\hat{M}_{air}$ from the torque observer. The estimated torque will lag behind the actual torque. FIG. 9 (b) shows the actual turbine mechanical power and the estimated mechanical power $\tilde{P}_{mech}$ calculated from the product of speed and estimated turbine torque.

Further Examples

It will be readily appreciated that further Examples could be shown where the power reference $P_{ref}$ is a combination of the instantaneous estimated mechanical power of the turbine $\tilde{P}_{mech}$ and a moving average of the estimated mechanical power of the turbine over a particular time window, optionally using either filtered or unfiltered versions.

What is claimed is:

1. An assembly comprising:
a turbine that is driven to rotate by moving fluid;
a generator having a rotor that is driven by an output shaft of the turbine;
a power converter; and
a controller providing a main torque reference ($M_{ref}$) to the power converter to control the torque of the generator;
wherein the controller includes:
a power reference function block for providing a power reference ($P_{ref}$) derived from an estimate of the available mechanical power in the turbine or a measured pressure drop ($\Delta p$) across the turbine;
a power controller function block that uses the power reference ($P_{ref}$) to derive a power control torque reference ($M_{ref}^{Po}$), the power control torque reference ($M_{ref}^{Po}$) being configured for continuously tracking the main torque reference ($M_{ref}$); and
a speed controller function block that uses a comparison of a measured speed ($\omega$) of the generator and a maximum speed limit ($\omega_{max}$) to derive a speed control torque reference ($M_{ref}^{\omega}$), the speed control torque reference ($M_{ref}^{\omega}$) being configured for continuously tracking the main torque reference ($M_{ref}$).

2. The assembly of claim 1, further comprising anti stall torque limit function block that selectively modifies whichever of the power control and speed control torque references ($M_{ref}^{Po}$, $M_{ref}^{\omega}$) is the maximum at any time instant to derive the main torque reference ($M_{ref}$) by applying a speed dependent gain that decreases with decreasing turbine speed so that the main torque reference ($M_{ref}$) is zero for a minimum speed limit.

3. The assembly of claim 1, wherein the power controller function block includes a proportional-integral (PI) controller and the speed controller function block includes a PI controller.

4. The assembly of claim 1, wherein the power controller function block and the speed controller function block both use the main torque reference ($M_{ref}$) to drive the power control and speed control torque references ($M_{ref}^{Po}$, $M_{ref}^{\omega}$), respectively.

5. The assembly of claim 1, wherein the estimate of the available mechanical power in the turbine is derived from an estimate of the mechanical turbine torque ($\tilde{M}_{air}$) and a measured speed ($\omega$) of the generator or from a measured pressure drop ($\Delta p$) across the turbine and known torque characteristics of the turbine.

6. The assembly of claim 5, wherein the estimate of the mechanical turbine torque ($\tilde{M}_{air}$) is further derived using a measured generated power ($P_{fb}$) or an estimate of generated power ($\tilde{P}_{gen}$) that is derived from the main torque reference ($M_{ref}$), known generator characteristics, and a measure speed ($\omega$) of the generator.

7. The assembly of claim 1, wherein the estimate of the available mechanical power is filtered before it is used by the power reference function block to derive the power reference ($P_{ref}$).

8. The assembly of claim 1, wherein the power controller function block further uses a measured generator power ($P_{fb}$) to derive the power control torque reference ($M_{ref}^{Po}$).

9. The assembly of claim 1, wherein the power controller function block further uses an estimate of generated power ($\tilde{P}_{gen}$) to derive the power control torque reference ($M_{ref}^{Po}$), the estimate of generated power ($\tilde{P}_{gen}$) being derived from the main torque reference ($M_{ref}$), known generator characteristics, and a measured speed ($\omega$) of the generator.

10. A control strategy for an assembly comprising: a turbine that is driven to rotate by moving fluid; a generator having a rotor that is driven by an output shaft of the turbine; a power converter; and a controller providing a main torque reference ($M_{ref}$) to the power converter to control the torque of the generator; wherein the control strategy includes the steps of:
providing a power reference ($P_{ref}$) that is derived from an estimate of the available mechanical power in the turbine or a measured pressure drop ($\Delta p$) across the turbine;
using the power reference ($P_{ref}$) to derive a power control torque reference ($M_{ref}^{Po}$), the power control torque reference)($M_{ref}^{Po}$) being configured for continuously tracking the main torque reference ($M_{ref}$);
using a comparison of a measured speed ($\omega$) of the generator and a maximum speed limit ($\omega_{max}$) to derive a speed control torque reference ($M_{ref}^{\omega}$), the speed control torque reference ($M_{ref}^{\omega}$) being configured for continuously tracking the main torque reference ($M_{ref}$).

11. The control strategy of claim 10, further comprising the step of selectively modifying whichever of the power control and speed control torque references ($M_{ref}^{Po}$, $M_{ref}^{\omega}$) is the maximum at any time instant to derive the main torque reference ($M_{ref}$) by applying a speed dependent gain that decreases with decreasing turbine speed so that the main torque reference ($M_{ref}$) is zero for a minimum speed limit.

12. The control strategy of claim 10, wherein the power reference ($P_{ref}$) follows one or more of: (i) a moving average of the estimated available mechanical power in the turbine, and (ii) an instantaneous estimate of the available mechanical power in the turbine.

13. The control strategy of claim 10, wherein the main torque reference ($M_{ref}$) is used to derive the power control and speed control torque references ($M_{ref}^{Po}$, $M_{ref}^{\omega}$).

14. The control strategy of claim 10, wherein the estimate of the available mechanical power in the turbine is derived from an estimate of the mechanical turbine torque ($\tilde{M}_{air}$) and a measured speed ($\omega$) of the generator or a measured drop ($\Delta p$) across the turbine and known torque characteristics of the turbine.

15. The control strategy of claim 10, wherein the estimate of the mechanical turbine torque is further derived using a measured generated power ($P_{fb}$) or an estimate of generated power ($\tilde{P}_{gen}$) that is derived from the main torque reference ($M_{ref}$), known generator characteristics, and a measure speed ($\omega$) of the generator.

16. The control strategy of claim 10, wherein the estimate of the available mechanical power is filtered before it is used by the power reference function block to derive the power reference ($P_{ref}$).

17. The control strategy of claim 10, wherein a measured generated power ($P_{fb}$) is used to derive the power control torque reference ($M_{ref}^{Po}$).

18. The control strategy of claim 10, wherein an estimate of generated power ($\tilde{P}_{gen}$) is used to derive the power control torque reference ($M_{ref}^{Po}$), the estimate of generated power ($\tilde{P}_{gen}$) being derived from the main torque reference ($M_{ref}$), known generator characteristics, and the measured speed ($\omega$) of the generator.

* * * * *